United States Patent
Kron et al.

(10) Patent No.: US 9,097,510 B2
(45) Date of Patent: Aug. 4, 2015

(54) SYSTEM FOR POSITIONAL MEASUREMENT IN A COUPLING DEVICE

(75) Inventors: Clas Kron, Torslanda (SE); Peter Sandstrom, Askim (SE); Peter Stromberg, Goteborg (SE)

(73) Assignee: Acoem AB, Molndal (SE)

( * ) Notice: Subject to any disclaimer, the term of this patent is extended or adjusted under 35 U.S.C. 154(b) by 203 days.

(21) Appl. No.: 13/806,768

(22) PCT Filed: Jun. 30, 2011

(86) PCT No.: PCT/SE2011/050890
§ 371 (c)(1),
(2), (4) Date: Feb. 26, 2013

(87) PCT Pub. No.: WO2012/002901
PCT Pub. Date: Jan. 5, 2012

(65) Prior Publication Data
US 2013/0154619 A1    Jun. 20, 2013

(30) Foreign Application Priority Data
Jun. 30, 2010  (SE) ...................................... 1050720

(51) Int. Cl.
G01B 7/31    (2006.01)
F16D 3/50    (2006.01)

(52) U.S. Cl.
CPC ... *G01B 7/31* (2013.01); *F16D 3/50* (2013.01)

(58) Field of Classification Search
CPC ................................ G01D 11/245; G01B 7/02
USPC ........... 324/167, 207.23–207.25, 220, 750.16
See application file for complete search history.

(56) References Cited

U.S. PATENT DOCUMENTS

| 4,148,013 | A * | 4/1979 | Finn et al. ................. 340/870.11 |
| 8,360,728 | B2 * | 1/2013 | Hildebrand et al. ........... 416/145 |
| 2002/0022209 | A1 * | 2/2002 | Polino et al. ................... 432/115 |
| 2003/0025030 | A1 * | 2/2003 | Granger et al. ............ 242/596.3 |
| 2009/0055129 | A1 | 2/2009 | Altieri et al. |

FOREIGN PATENT DOCUMENTS

DE    102006026462    12/2007

OTHER PUBLICATIONS

International Search Report and Written Opinion from corresponding International Application No. PCT/SE2011/050890, dated Jan. 18, 2012.

* cited by examiner

*Primary Examiner* — Tung X Nguyen
*Assistant Examiner* — Alesa Allgood
(74) *Attorney, Agent, or Firm* — Renner, Otto, Boisselle & Sklar, LLP

(57) ABSTRACT

The present invention relates to a system (S) for measuring the position of a coupling member (1) that comprises a shaft part (2), a first flange (3), a second flange (4) and a first resilient bushing (5), which secures the first flange (3) to the shaft part (2), and a second resilient bushing (6), which secures the second flange (4) to the shaft part (2). Each resilient bushing (5, 6) is arranged with a resilient yield between the respective flange (3, 4) and the shaft part (2). The flanges (3, 4) are intended to be secured to a respective first shaft (7) and second shaft (8). When the coupling member (1) is placed between the first shaft (7) and the second shaft (8), it is intended to transfer a rotation movement from the first shaft (7) to the second shaft (8). The system (S) further comprises at least a first head unit (9) mounted on a first fixture (10), where the first fixture (10) is designed to be mounted between the first flange (3) and the shaft part (2) via existing mounting elements for the first resilient bushing (5). The fixture (10) comprises at least one sensor (15) arranged for position measurement between the first flange (3) and the shaft part (2).

17 Claims, 7 Drawing Sheets section A-A

SYSTEM FOR POSITIONAL MEASUREMENT IN A COUPLING DEVICE

TECHNICAL FIELD

The present invention relates to a system for measuring the position of a coupling member that comprises a shaft part, a first flange and a second flange. The coupling member further comprises a first resilient bushing, which secures the first flange to the shaft part, and a second resilient bushing, which secures the second flange to the shaft part. Each resilient bushing is arranged with a resilient yield between the respective flange and the shaft part. The first flange is intended to be secured to a first shaft and the second flange is intended to be secured to a second shaft, and the coupling member, when placed between the first shaft and the second shaft, is intended to transfer a rotation movement from the first shaft to the second shaft. The system further comprises at least a first head unit mounted on a first fixture.

The present invention also relates to a system for measuring the position of a coupling member in a wind power plant, where the coupling member comprises a shaft part, a first flange and a second flange. The coupling member further comprises a first resilient bushing, which secures the first flange to the shaft part, and a second resilient bushing, which secures the second flange to the shaft part. Each resilient bushing is arranged with a resilient yield between the respective flange and the shaft part. The first flange is intended to be secured to a first shaft and the second flange is intended to be secured to a second shaft, and the coupling member, when placed between the first shaft and the second shaft, is intended to transfer a rotation movement from the first shaft to the second shaft.

The present invention also relates to a system for measuring the position of a coupling member, where the coupling member comprises a shaft part, a first flange and a second flange, where the coupling member further comprises a first resilient bushing, which secures the first flange to the shaft part, and a second resilient bushing, which secures the second flange to the shaft part, where each resilient bushing is arranged with a resilient yield between the respective flange and the shaft part, where the first flange is intended to be secured to a first shaft and the second flange is intended to be secured to a second shaft, and the coupling member, when placed between the first shaft and the second shaft, is intended to transfer a rotation movement from the first shaft to the second shaft, where the system further comprises at least a first head unit mounted on a first fixture.

BACKGROUND ART

In some applications, it is necessary to couple a first shaft and a second shaft together, where the first shaft is a driving shaft, such that the first shaft comes to drive the second shaft.

An example of such an application is a wind power plant, where a gearbox shaft has to be coupled to a generator shaft. Such elastic couplings must be able to take up some deviations in the alignment of the shafts and are previously known. Such an elastic coupling, or coupling member, normally consists of a rigid shaft part and of two resilient bushings at each end of the rigid shaft part. The resilient bushings are normally mounted on the respective first and second shaft via suitable flanges.

It is of course preferable for the alignment between the first shaft and the second shaft to be as correct as possible, for which reason a manual alignment is nowadays carried out during assembly using the necessary measuring equipment, for example laser-based measuring equipment.

However, there is a need to be able to measure the alignment between the first shaft and the second shaft, that is to say the alignment of the coupling member, continuously during operation, which cannot be done using existing measuring equipment. Since the shafts concerned are rotating shafts, measuring equipment must not create an imbalance when mounted. It is also desirable to be able to measure this alignment using existing structures, without causing damage to them.

It is also desirable to be able to detect other operating data, such as the torque transmitted by the coupling being able to be detected by measuring the position of the coupling member.

It is therefore necessary to be able to measure the position of a coupling member between a first shaft and a second shaft continuously during operation, where a rotation movement of the first shaft is transferred to the second shaft via the coupling member which elastically couples the first shaft to the second shaft, and where introduction of imbalance is also avoided.

It is also desirable that equipment for measuring the position of a coupling member can be mounted on existing equipment without the need for any mechanical working.

DISCLOSURE OF THE INVENTION

It is an object of the present invention to make available a system for measuring the position of a coupling member between a first shaft and a second shaft continuously during operation, where a rotation movement of the first shaft is transferred to the second shaft via the coupling member which elastically couples the first shaft to the second shaft, and where introduction of imbalance is avoided.

It is also an object of the present invention to make available a system which is used for measuring alignment as above and which allows equipment to be mounted on existing machinery without the need to perform any mechanical working.

These objects are achieved with a system for measuring the position of a coupling member which comprises a shaft part, a first flange and a second flange.

The coupling member further comprises a first resilient bushing, which secures the first flange to the shaft part, and a second resilient bushing, which secures the second flange to the shaft part. Each resilient bushing is arranged with a resilient yield between the respective flange and the shaft part. The first flange is intended to be secured to a first shaft and the second flange is intended to be secured to a second shaft, and the coupling member, when placed between the first shaft and the second shaft, is intended to transfer a rotation movement from the first shaft to the second shaft. The system further comprises at least a first head unit mounted on a first fixture. The first fixture is designed to be mounted between the first flange and the shaft part via existing mounting elements for the first resilient bushing, where the fixture comprises at least one sensor arranged for position measurement between the first flange and the shaft part.

The measurement of the position of the coupling member can comprise measuring the alignment of the coupling member and/or measuring a change of position in the rotation direction of at least one of the shafts.

According to one example, it comprises a second head unit mounted on a second fixture, where the second fixture is designed to be mounted between the second flange and the shaft part via existing mounting elements for the second resilient bushing, where said fixture comprises at least one sensor arranged for position measurement between the second flange and the shaft part.

According to another example, each fixture comprises a central hub with at least two spokes extending radially from the central hub, where each head unit is designed to be mounted on said hub. Each sensor can be designed to be placed on at least one corresponding spoke.

The sensor can be, for example, a Hall sensor and is then designed to cooperate with a corresponding magnet, where the position measurement takes place between each Hall sensor and corresponding magnet.

According to another embodiment of the invention, it comprises a first fixture designed to be mounted between the first flange and the shaft part, said fixture comprising at least one sensor arranged for position measurement between the first flange and the shaft part, and a second fixture designed to be mounted between the second flange and the shaft part (33), the first fixture and the second fixture being connected via connecting elements.

More examples are set forth in the dependent claims.

The object of the present invention is also achieved with a system for measuring the position of a coupling member in a wind power plant, where the coupling member comprises a shaft part, a first flange and a second flange. The coupling member further comprises a first resilient bushing, which secures the first flange to the shaft part, and a second resilient bushing, which secures the second flange to the shaft part. Each resilient bushing is arranged with a resilient yield between the respective flange and the shaft part. The first flange is intended to be secured to a first shaft and the second flange is intended to be secured to a second shaft, and the coupling member, when placed between the first shaft and the second shaft, is intended to transfer a rotation movement from the first shaft to the second shaft. The system comprises means for measuring a first angle between the first flange and the shaft part and a second angle between the second flange and the shaft part.

The present invention affords a number of advantages, among which it is possible during operation
  to detect coupling errors;
  to detect risks so as to be able to avoid breakdowns;
  to optimize the efficacy of the generator;
  to optimize the useful life of the components involved; and
  to measure the torque transferred from the coupling by measuring the change of position in the rotation direction.

DESCRIPTION OF THE FIGURES

The present invention will now be described in more detail with reference to the attached drawings, in which.

DESCRIPTION OF EMBODIMENTS

Figure 1:
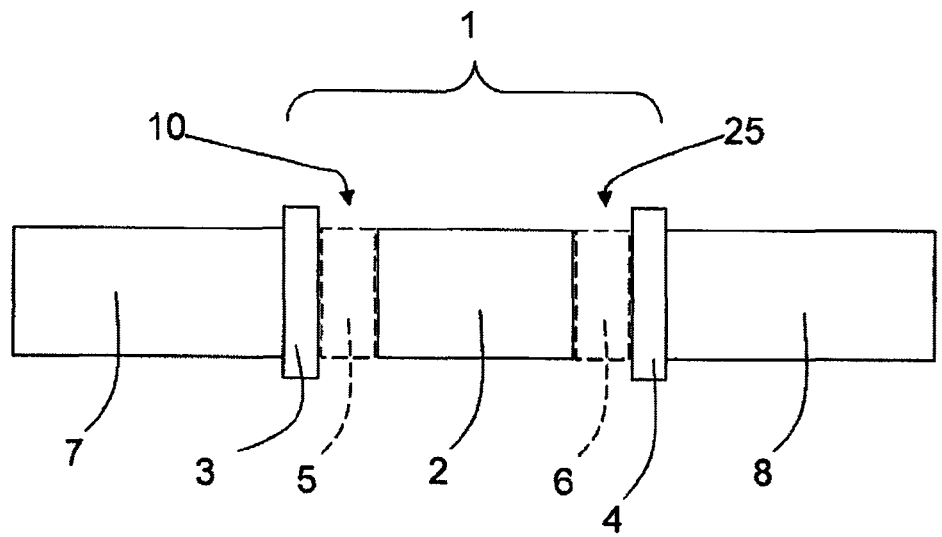
FIG. 1 shows a simplified view of two shafts with elastic coupling.

Referring to FIG. 1, an elastic coupling in the form of a coupling member 1 comprises a shaft part 2, a first flange 3 and a second flange 4. The coupling member 1 further comprises a first resilient bushing 5, which secures the first flange 3 to the shaft part 2, and a second resilient bushing 6, which secures the second flange 4 to the shaft part 2.

Each resilient bushing 5, 6 is arranged with a resilient yield between the respective flange 3, 4 and the shaft part 2, where the first flange 3 is intended to be secured to a first shaft 7 and the second flange 4 is intended to be secured to a second shaft 8. The coupling member 1, when placed between the first shaft 7 and the second shaft 8, is intended to transfer a rotation movement from the first shaft 7 to the second shaft 8, where the resilient yield of the resilient bushings 5, 6 is intended to take up errors of alignment between the first shaft 7 and the second shaft 8, as is illustrated in FIG. 3.

Figure 3:
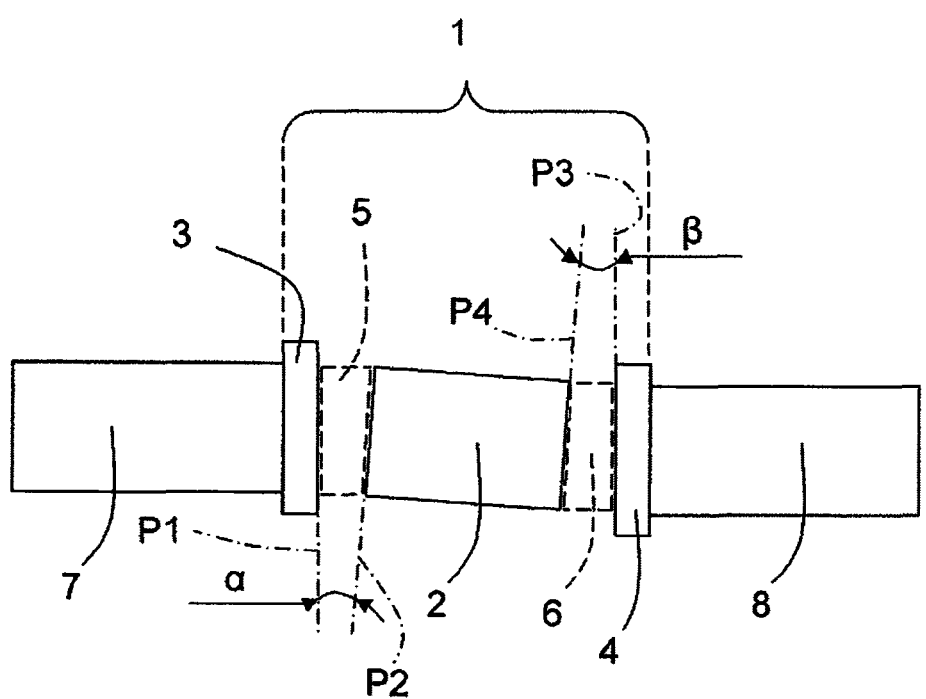
FIG. 3 shows a simplified view of two shafts with elastic coupling, where there is an angle error.

FIG. 3 shows how a first angle α is present between a first plane P1 of the end of the first flange 3 facing the shaft part 2 and a second plane P2 of the end of the shaft part 2 facing the first flange 3, where the first plane P1 is at right angles to the axial extent of the first shaft 7, and the second plane P2 is at right angles to the axial extent of the shaft part 2. In the same way, a second angle β is present between a third plane P3 of the end of the second flange 4 facing the shaft part 2 and a fourth plane P4 of the end of the shaft part 2 facing the first flange 3, where the third plane P3 is at right angles to the axial extent of the second shaft 8, and the fourth plane P4 is at right angles to the axial extent of the shaft part 2.

When no coupling error is present, the planes P1, P2, P3, P4 are parallel to one another.

Figure 4:
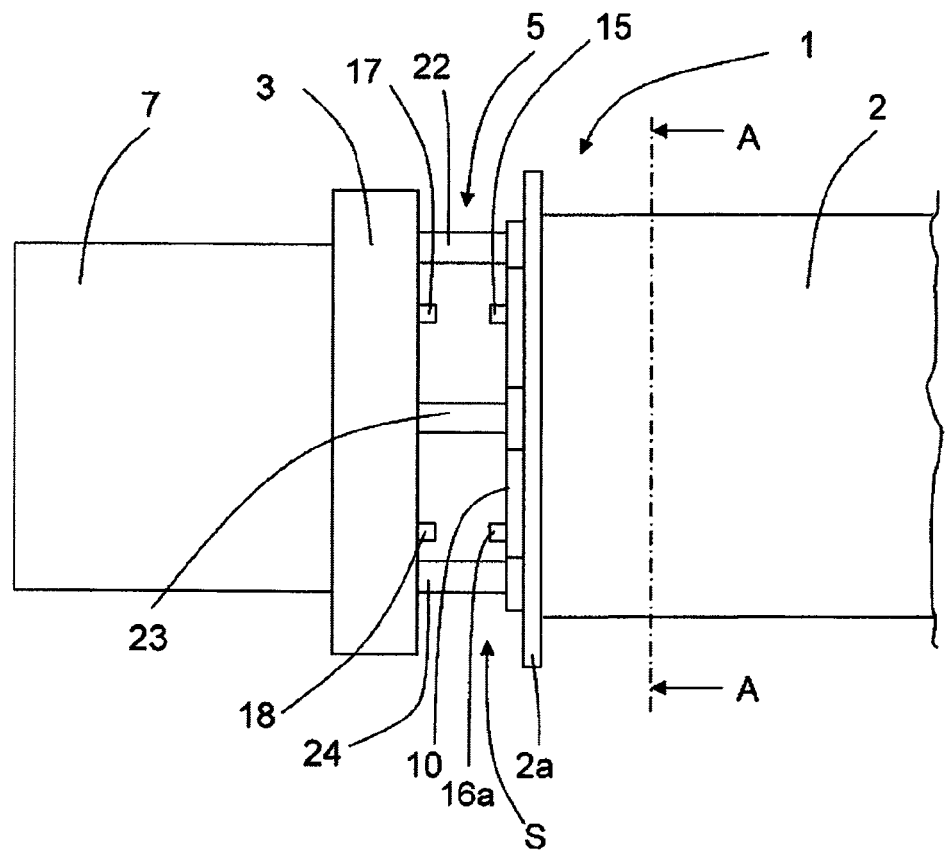
FIG. 4 shows a simplified view of two shafts with elastic coupling, with mounted measuring fixture.
Figure 5:
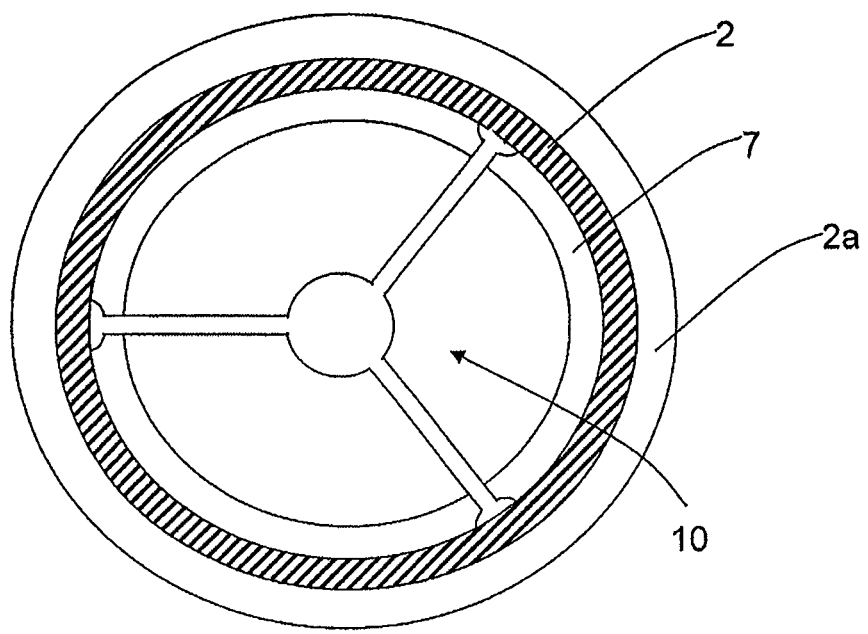
FIG. 5 shows a simplified cross section of FIG. 4.

In accordance with the present invention, and with reference to FIG. 4 and FIG. 5 which show in more detail the area around the first resilient bushing 5, a first fixture 10 is mounted between the first flange 3 and the shaft part 2 with the aid of existing mounting elements for the first resilient bushing 5, such that the first fixture 10 bears on the shaft part 2.

Figure 2:
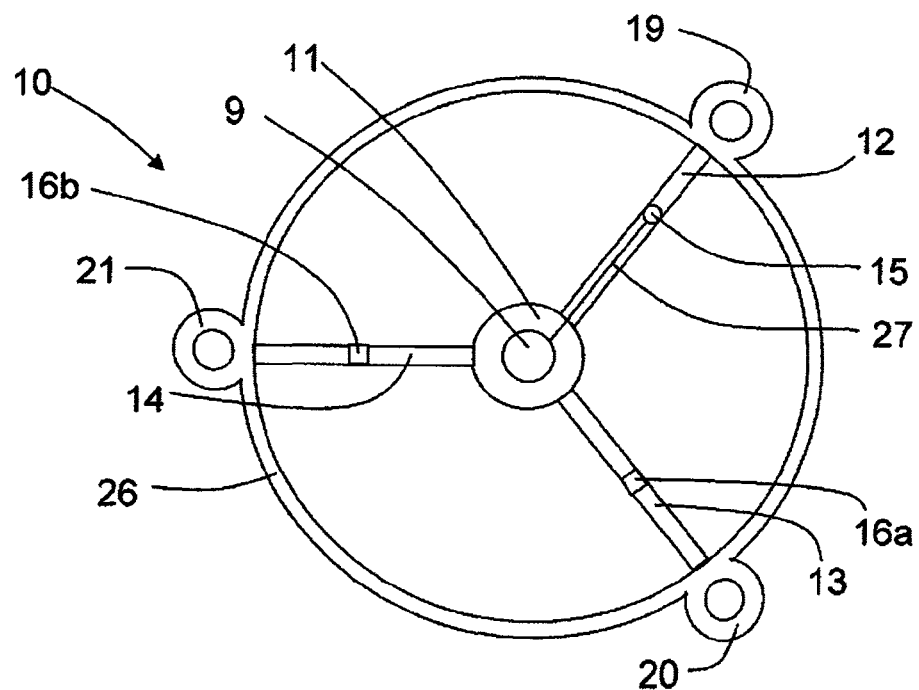
FIG. 2 shows a simplified view of a measuring fixture according to the present invention.

Referring also to FIG. 2, the fixture 10 comprises a central hub 11 with three spokes 12, 13, 14 extending radially from the central hub 11, where a head unit 9 is designed to be mounted on the central hub 11.

A sensor is placed on a first spoke 12, a first weight 16a is arranged on a second spoke 13 and is displaceable along the spoke 13, and a second weight 16b is arranged on a third spoke 14 and is displaceable along the spoke 13. The weights 16a, 16b are designed to be adjusted such that any imbalance is compensated.

The sensor 15 is a Hall sensor and is designed to cooperate with a corresponding magnet 17, which is mounted opposite the Hall sensor on the first flange 3, where the distance measurement takes place between the Hall sensor 15 and the magnet 17.

A third weight 18 is placed on the second flange 5 in order to compensate any imbalance that the magnet 17 may create.

The head unit 9 comprises a power unit and electronics, where a signal from the Hall sensor is detected and sent wirelessly from the head unit 9 to an external unit (not shown) for processing and evaluation of measurement data. The external unit can be integrated with existing monitoring equipment in an installation in which the first shaft 7 and the second shaft 8 are present.

An example of such an installation is a wind power plant, where the coupling member 1 is coupled between the first shaft, which then comes from a gear, and the second shaft, which then comes from a generator.

Referring to FIGS. 2, 4 and 5, the present invention thus entails that mounting holes 19, 20, 21 of the fixture 10, here shown in the form of mounting lugs 19, 20, 21, are designed to cooperate with existing mounting devices for the first resilient bushing 5. The first resilient bushing 5 comprises resilient means 22, 23, 24, which are indicated symbolically in FIG. 4. These resilient means 22, 23, 24 are secured to the first flange 3 and the shaft part 2 via existing securing holes (not shown) therein. The mounting holes 19, 20, 21 of the fixture 10 are designed such that, in this example, they match the securing holes of the shaft part 2 for the first resilient bushing 5 and are secured there with associated bolts; the fixture is thus mounted when the coupling member 1 is dismantled. In this example, these securing holes together with the necessary bolts thus constitute the existing mounting elements for the first resilient bushing 5.

According to the present invention, all the necessary alignment information can be obtained by measuring the angle error defined by the above-discussed first angle α and second angle β.

To be able to measure the second angle β and in this way obtain all the necessary alignment information, a corresponding second fixture 25, shown only schematically in FIG. 1, is preferably mounted in a corresponding way between the second flange 4 and the shaft part 2 with the aid of existing mounting elements for the second resilient bushing 6, such that the second fixture 25 bears on the shaft part 2. In this way, distance measurement can also take place between the second flange 4 and the shaft part 2, whereby both the first angle α and also the second angle β can be obtained.

The invention is not limited to the above and instead can be varied freely within the scope of the attached claims. For example, the number of spokes can vary, but each fixture should comprise at least two spokes. How many weights are used to compensate for imbalance of the fixture will depend on the number of spokes. For example, one weight may be sufficient for an even number of evenly distributed spokes.

Figure 6:
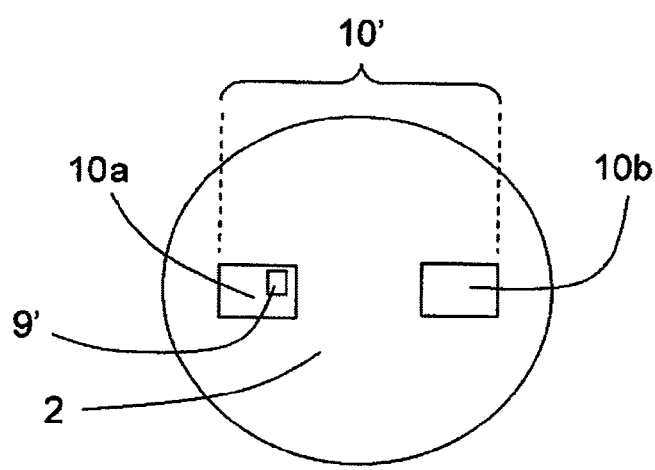
FIG. 6 shows a simplified view of an alternative measuring fixture according to the present invention.

Each fixture can be of another design, but still using the existing mounting elements for the respective resilient bushing 5, 6. For example, with reference to FIG. 6, a fixture 10' can comprise two parts 10a, 10b, where a first part 10a comprises a head unit 9' and is mounted in a first existing securing hole of the shaft part 2, and where a second part 10b comprises a counterweight which is mounted in a second existing securing hole of the shaft part 2, such that the imbalance introduced by the first part 10a is compensated.

The magnet 17 and its counterweight 18 can be secured in a suitable manner, for example by adhesive bonding. Alternatively, the magnet 17 and its counterweight 18 can be arranged on a separate fixture, the latter also being secured with the aid of existing mounting elements which, with reference to FIG. 4, should be located on the first flange 3. The number of weights used to compensate for the magnet can also vary and can therefore be greater than the one weight 18 shown.

The mounting can of course be done in another way. For example, each fixture 10 can be mounted by using existing securing holes in the respective flange 3, 4 instead, in which case each magnet 17, with its counterweight, is mounted on the shaft part 2. Each fixture preferably bears at least partially on the respective flange 3, 4 and/or shaft part 2. These securing holes in the respective flange 3, 4 in this case constitute the existing mounting elements for the respective resilient bushing 5, 6.

Each fixture can also have many different configurations, the main object of the present invention being to use existing mounting elements for the respective resilient bushing.

The invention can of course be used with only one fixture, although two fixtures should be used to obtain both the angles α, β. In its simplest form, the invention comprises only one fixture.

Each fixture comprises at least one head unit.

The sensor does not need to be a Hall sensor, and instead it is possible for the system to use any type of sensor designed for distance measurement, or more generally for position measurement, for example a distance probe. In such cases, there is no need for an opposite magnet to be mounted.

The fixtures with associated sensors, magnets and weights are included in a system for measuring the alignment of a coupling member 1.

The invention also includes making available a system for measuring the alignment of a coupling member 1 in accordance with the above in a wind power plant, where the coupling member 1 is coupled between a first shaft, which comes from a gear, and a second shaft, which comes from a generator. The system comprises means for measuring a first angle α between the first flange 3 and the shaft part 2 and a second angle β between the second flange 4 and the shaft part 2. This system preferably consists of the system comprising at least one fixture with associated equipment as described above.

As is shown in FIG. 2, the spokes 12, 13, 14 are preferably held together by a surrounding securing ring 26, on which said mounting lugs 19, 20, 21 are secured.

The sensor 15 can communicate with the corresponding head unit 9 wirelessly, but also via a fixed connection 27.

Although the expression distance measurement has been used above, the present invention can generally also concern position measurement.

According to a further example, such position measurement would involve measuring a change of position in the rotation direction of the shafts 7, 8. Such a change of position would be able to be measured, for example, with the aid of a multi-axis Hall sensor. In this way, the torque transferred by the coupling would be able to be detected. This means that the present invention, which has mainly been described as concerning measuring the alignment of a coupling member 1, relates in a more general form to a position measurement of a coupling member 1.

Other sorts of position measurements are of course possible.

The present invention relates generally to a system S, as is indicated in FIG. 4, for measuring the alignment of a coupling member in accordance with the above, where the system S further comprises at least a first head unit 9 mounted on a first fixture 10, which is designed to be mounted between the first flange 3 and the shaft part 2 via existing mounting elements for the first resilient bushing 5. Said fixture 10 comprises at least one sensor 15 arranged for position measurement between the first flange 3 and the shaft part 2. The resilient means 22, 23, 24, which are indicated symbolically in FIG. 4, can be designed in many ways that are already well known for this type of coupling member.

Figure 7:
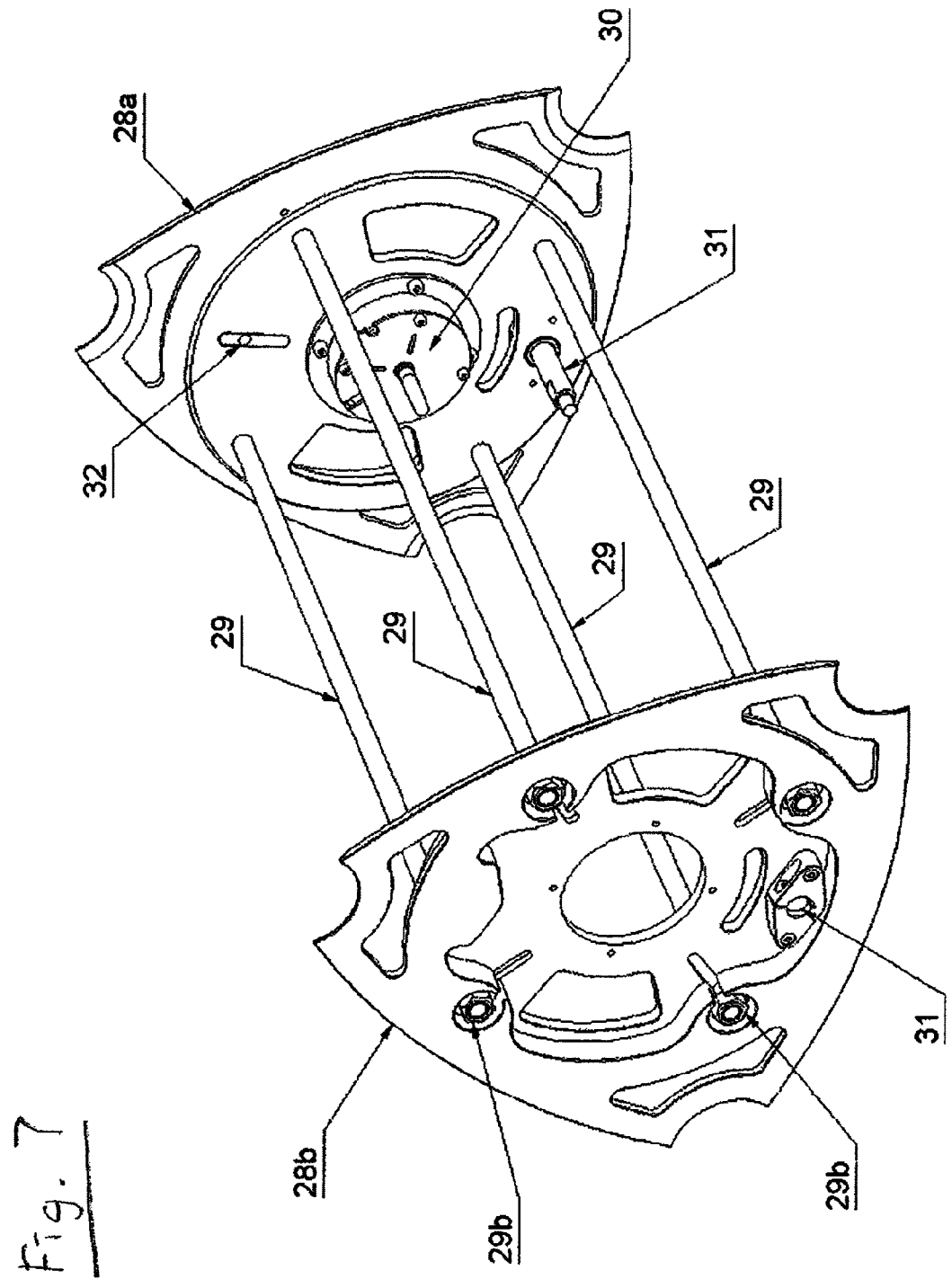
FIG. 7 shows a perspective view of an alternative embodiment of the invention.

FIG. 7 shows another embodiment of the present invention. This embodiment has essentially the same object and areas of application as have been described with reference to the embodiment above, but it is constructed and secured differently than what has been described above. As can be seen from FIG. 7, this second embodiment is based on a first fixture 28a and a second fixture 28b being arranged on both sides of a shaft part (not shown in FIG. 7, but corresponds to the shaft part 2 in FIG. 1). More specifically, the fixtures 28a, 28b are then secured between the respective end portions of this shaft part by being connected with the aid of a certain number of connecting elements 29, preferably four connecting elements 29. These connecting elements 29 can preferably be in the form of relatively thin rods of suitable material, for example steel or titanium. However, the invention is not limited in terms of the number, material or design of said connecting elements 29.

The securing can preferably be obtained by the respective end portion of each connecting element 29 being threaded and cooperating with a nut 29b on the opposite face of each fixture 28a, 28b.

In analogy with what has been described above, the first-mentioned fixture 28a is designed with a central hub 29, which supports a head unit 30 which in turn corresponds to the head unit 9 shown in FIG. 2. Moreover, the fixture 28a supports a sensor 31, preferably a Hall sensor, which is designed in the above-mentioned manner to cooperate with a corresponding magnet (not shown) which is mounted on a flange (not shown in FIG. 7). Distance measurement between the sensor and the magnet is permitted in this way.

In a manner that has also been described above, the respective fixture 2 can be provided with at least one weight 32, which can be displaced in the radial direction along the fixture 28a. This weight 32 can be adjusted in such a way that any imbalance is compensated during operation.

In the same way as has been described above, the head unit 30 according to FIG. 7 comprises a power unit and electronics, and a signal from the sensor 31 can be detected and then sent wirelessly from the head unit 30 to an external unit (not shown) for processing and evaluation of measurement data.

Figure 8:
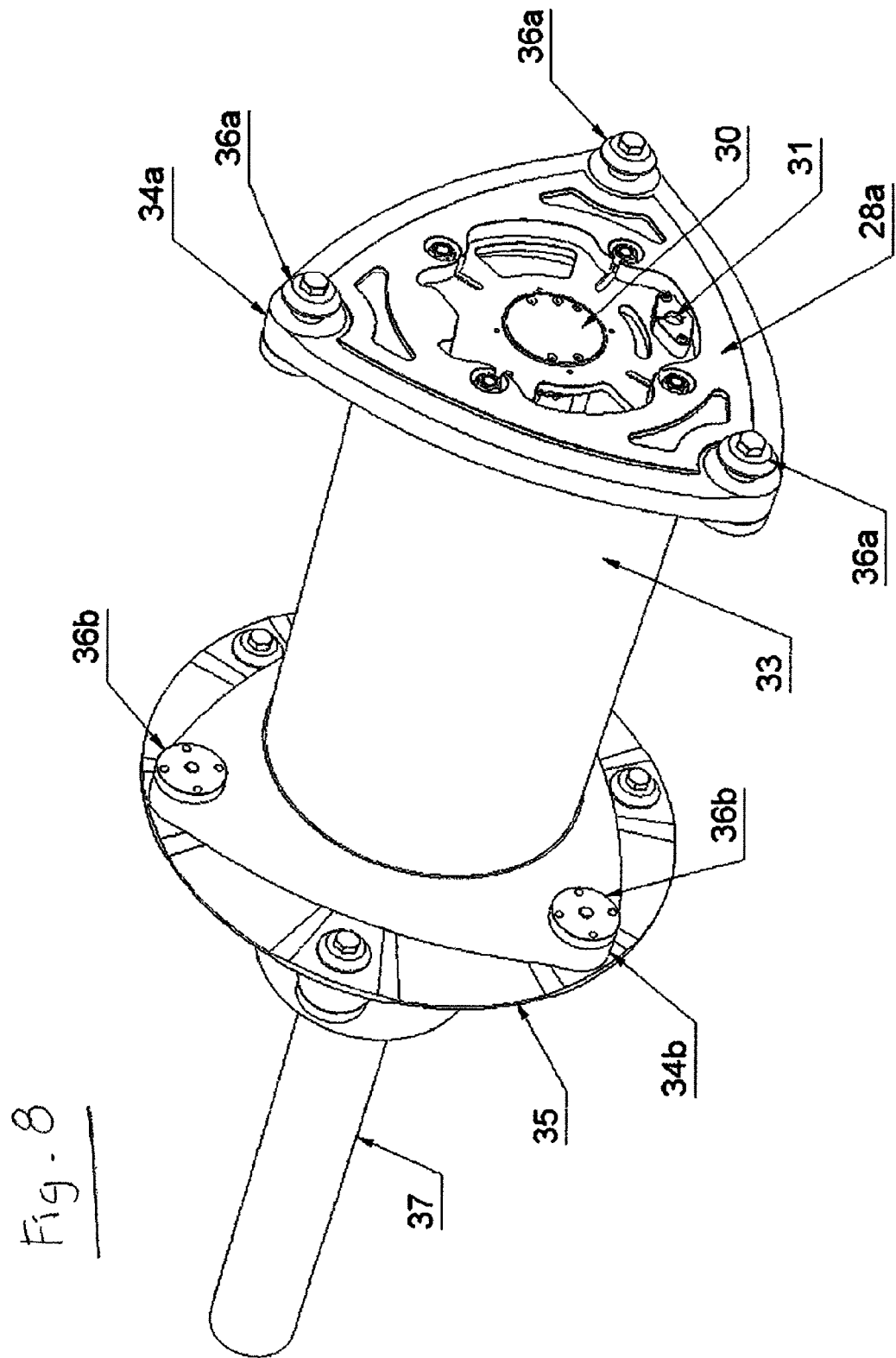
FIG. 8 shows another perspective view of this alternative embodiment.

FIG. 8 shows how the invention, according to the alternative embodiment also shown in FIG. 7, can be arranged such that the first fixture 28a and the second fixture (not shown in FIG. 8) are secured on both sides of a shaft part 33. The mounting is such that the abovementioned connecting elements 29 run inside the shaft part 33, which for this purpose is hollow.

Resilient bushings 34a, 34b are also arranged between the end portions of the shaft part 33 and each fixture. Each bushing 34a, 34b can be mounted in a corresponding flange 35 (only one flange is shown in FIG. 8) via a number of securing devices 36a, 36b.

According to the concept of the invention, the existing securing devices 36a, 36b can be used to mount each fixture 28a, 28b on the bushings 34a, 34b. In principle, however, it is not necessary to use the existing securing devices 36a, 36b for this securing; the fixtures 28a, 28b can in principle be mounted by being tensioned relatively stiffly with the aid of the connecting elements 29 such that they are pressed against the respective bushing 34a, 34b and the respective end of the shaft part 33. In this way, each fixture 28a, 28b is secured between a flange 35 and a bushing 34a, 34b.

In a manner corresponding to what has been described above, the flange 35 is designed to be secured to a first shaft 37. An opposite flange (not shown in FIG. 8) is then arranged on the other bushing 34b and is designed to be secured in a second shaft (not shown).

The embodiment that has been described with reference to FIGS. 7 and 8 has generally the same function as has been described with reference to FIGS. 1-6, but it provides a reliable and space-saving way of securing each fixture 28a, 28b, not least because the connecting elements 29 extend inside the shaft part 33. The securing is also stable during rotation in operation and permits simple assembly.

The invention is not limited to the abovementioned embodiments and instead is defined by the attached claims. For example, the embodiment shown in FIGS. 7 and 8 can comprise a head unit 30 that communicates and cooperates with two sensors 31 (one on each fixture 28a, 28b). Alternatively, the invention can be such that each fixture 28a, 28b comprises a head unit and an associated sensor.

The invention claimed is:

1. A system for measuring the position of a coupling member, the system comprising:
    the coupling member, wherein the coupling member comprises:
    a shaft part,
    a first flange,
    a second flange,
    a first resilient bushing securing the first flange to the shaft part, and
    a second resilient bushing securing the second flange to the shaft part, wherein:
        each resilient bushing is arranged with a resilient yield between the respective flange and the shaft part,
        the first flange is configured to be secured to a first shaft
        the second flange is configured to be secured to a second shaft, and
        the coupling member, when placed between the first shaft and the second shaft, is configured to transfer a rotation movement from the first shaft to the second shaft, and
    a first fixture configured to be mounted between the first flange and the shaft part via existing mounting elements for the first resilient bushing, wherein the first fixture comprises at least one sensor arranged to measure a distance between the first flange and the shaft part;
    at least a first head unit mounted on the first fixture, wherein the first head unit comprises a power unit and electronics for transmitting the distance measured by the at least one sensor.

2. System according to claim 1, wherein the measurement of the position of the coupling member comprises measuring the alignment of the coupling member.

3. System according to claim 1, wherein measurement of the distance between the first flange and the shaft part comprises measuring a change in the distance between the first flange and the shaft part in the rotation direction of the shaft.

4. System according to claim 1, further comprising a second head unit mounted on a second fixture, where the second fixture is configured to be mounted between the second flange and the shaft part via existing mounting elements for the second resilient bushing, where said second fixture comprises at least one second sensor arranged to measure a distance between the second flange and the shaft part.

5. System according to claim 1, wherein the first fixture is designed, in the mounted state, to bear at least partially on one of either the respective first flange or the shaft part.

6. System according to claim 1, further comprising, at least one weight, which is displaceable along the first fixture.

7. System according to claim 1, wherein the first fixture comprises a central hub with at least two spokes extending radially from the central hub, where the first head unit is configured to be mounted on said hub.

8. System according to claim 7, wherein the sensor is configured to be placed on at least one of the spokes.

9. System according to claim 1, wherein said sensor is a Hall sensor and is designed to cooperate with a corresponding magnet, where the position measurement takes place between the Hall sensor and the corresponding magnet.

10. System according to claim 9, further comprising at least one weight for each magnet.

11. A system for measuring the position of a coupling member in a wind power plant, the system comprising:

the coupling member, wherein the coupling member comprises:
a shaft part,
a first flange,
a second flange,
a first resilient bushing securing the first flange to the shaft part, and
a second resilient bushing securing the second flange to the shaft part, wherein:
  each resilient bushing is arranged with a resilient yield between the respective flange and the shaft part,
  the first flange is configured to be secured to a first shaft,
  the second flange is configured to be secured to a second shaft, and
  the coupling member, when placed between the first shaft and the second shaft, is configured to transfer a rotation movement from the first shaft to the second shaft, and
a first fixture configured to be mounted between the first flange and the shaft part via existing mounting elements for the first resilient bushing, wherein the first fixture comprises at least one sensor arranged to measure a distance between the first flange and the shaft part;
a second fixture configured to be mounted between the second flange and the shaft part via existing mounting elements for the second resilient bushing, wherein the second fixture comprises at least one second sensor arranged to measure a distance between the second flange and the shaft part;
a first head unit mounted on the first fixture, wherein the first head unit comprises a power unit and electronics for transmitting the distance measured by the at least one sensor; and
a second head unit mounted on the second fixture, wherein the second head unit comprises a second power unit and second electronics for transmitting the distance measured by the at least one second sensor;
an external processing unit configured to receive the distance measurements from the first and second electronics and determine a first angle (α) between the first flange and the shaft part and a second angle (β) between the second flange and the shaft part based on the received distance measurements.

12. A system for measuring the position of a coupling member, the system comprising:
the coupling member, wherein the coupling member comprises:
a shaft part,
a first flange, and
a second flange,
a first resilient bushing, securing the first flange to the shaft part, and
a second resilient bushing, securing the second flange to the shaft part, wherein:
  each resilient bushing is arranged with a resilient yield between the respective flange and the shaft part,
  the first flange is configured to be secured to a first shaft
  the second flange is configured to be secured to a second shaft, and
  the coupling member, when placed between the first shaft and the second shaft, is configured to transfer a rotation movement from the first shaft to the second shaft, and
a first fixture configured to be mounted between the first flange and the shaft part via existing mounting elements for the first resilient bushing, wherein the first fixture comprises at least one first sensor arranged to measure a distance between the first flange and the shaft part;
a second fixture configured to be mounted between the second flange and the shaft part via existing mounting elements for the second resilient bushing, wherein the second fixture comprises at least one second sensor arranged to measure a distance between the second flange and the shaft part;
a first head unit mounted on the first fixture, wherein the first head unit comprises a first power unit and first electronics for transmitting the distance measured by the at least one first sensor;
a second head unit mounted on the second fixture, wherein the second head unit comprises a second power unit and second electronics for transmitting the distance measured by the at least one second sensor, wherein the first fixture and the second fixture are connected via a connecting means.

13. System according to claim 12, wherein said connecting means extend inside the shaft part.

14. System according to claim 12, wherein said connecting means consist of a plurality of rods.

15. System according to claim 12, wherein the measurement of the position of the coupling member comprises measuring the alignment of the coupling member.

16. System according to claim 12, wherein measurement of the distance between the shaft part and the first flange or the second flange comprises measuring a change in the distance between the shaft part and the first flange or the second flange, respectively, in the rotation direction of the shaft.

17. System according to claim 12, wherein at least one of said first sensor or said second sensor is a Hall sensor.

* * * * *